United States Patent

Gasser

[15] 3,645,753
[45] Feb. 29, 1972

[54] MEAT-FLAVORING COMPOSITION

[72] Inventor: Rupert Josef Gasser, Kempttal, Switzerland

[73] Assignee: Societe d'Assistance Technique Pour Produits Neslte S.A., Lausanne, Switzerland

[22] Filed: July 10, 1970

[21] Appl. No.: 53,989

[30] Foreign Application Priority Data

June 5, 1970 Great Britain ...................... 27,262/70

[52] U.S. Cl. ............................................. 99/140 R, 99/110
[51] Int. Cl. ........................................................... A23l 1/22
[58] Field of Search .................................. 99/140 R, 110, 14

[56] References Cited

UNITED STATES PATENTS

| 2,934,436 | 4/1960 | May et al. | 99/140 R |
| 2,999,753 | 9/1961 | Witwicka et al. | 99/14 |
| 3,348,954 | 10/1967 | Green | 99/140 |

*Primary Examiner*—Morris O. Wolk
*Assistant Examiner*—Warren Bovee
*Attorney*—Watson, Leavenworth & Kelton

[57] ABSTRACT

A meat-flavored composition is prepared by heating together yeast autolysate, vegetable protein hydrolysate, hydrolysed meat extract and lactic acid, under specific conditions. Other features of the invention are disclosed in the specification.

6 Claims, No Drawings

MEAT-FLAVORING COMPOSITION

The present invention relates to a flavoring composition having a taste resembling that of roasted beef.

Various synthetic flavorings are known which are intended to reproduce the taste of cooked meats. In general, however, these products give only an approximate imitation of the natural taste and aroma of cooked meat and frequently develop "off" flavors on storage.

An object of the present invention is to provide a stable composition capable of imparting the natural flavor of beef to a broad range of food products.

Another object of the invention is to provide a process for preparing a flavoring composition starting from readily available natural materials.

According to the invention, a process for preparing a flavoring composition is characterized in that it comprises the following successive steps: heating, at a temperature of from 60° to 90° C. for 3 to 5 hours a mixture of from 40 to 50 parts by weight (dry matter) of yeast autolysate containing from 1 to 6 percent by weight of reducing substances (as hereinafter defined), at least 3 percent by weight of amino nitrogen and at least 7 percent by weight of total nitrogen, from 30 to 40 parts by weight (dry matter) of vegetable protein hydrolysate, from 3 to 6 parts by weight (dry matter basis) of enzymatically hydrolysed meat extract, from 0.9 to 2.7 parts by weight of lactic acid and from about 10 to about 30 parts by weight of water, holding the mixture at ambient temperature for from 8 to 12 days, adjusting the pH of the mixture to a value of 6.0 to 6.5 and the water content of the mixture to from 25 to 35 percent by weight, heating and mixture to a temperature of 60° to 90° C. holding the mixture at a temperature within this range for 1 to 3 hours, adjusting the pH to a value of 6.5 to 7.0 and maintaining the mixture at a temperature of 60° to 90° C. for 1 to 3 hours.

The yeast autolysate preferably contains from 1 to 2.5 percent by weight of reducing substances. The term "reducing substances" as used in the present specification means substances which reduce Fehling's solution, such as ribose or glucose. Any commercially available yeast autolysate meeting the above specifications may be used; it is conveniently employed as a paste containing about 80 percent by weight of dry matter.

The hydrolysed plant protein may be obtained by conventional acid hydrolysis of any plant protein. The aqueous product obtained by hydrolysis is preferably decolorized after filtration by treatment with active charcoal and it may be evaporated to a paste containing about 80 percent by weight of dry matter.

It has been found that commercial extracts of beef and and whale meat, produced by aqueous extraction, are particularly satisfactory sources of extract and are readily available. The extract may be hydrolysed by treatment with proteolytic enzymes, for example, papain or enzyme composition known as "Rhozyme P 11" (Röhm & Haas G.m.b.H., Darmstadt). Hydrolysis is preferably carried out under optimum conditions of temperature and pH for the enzyme used. Thus, for example, when papain is used the extract, diluted to about 15 percent by weight of solids content, may be heated with papain, in an amount of 5 percent by weight of the amino nitrogen in the extract, for about 1 hour at about 65° C., followed by heating at 100° C. for 5 to 10 minutes to inactivate the enzymes, and evaporation to a dry matter content of about 80 percent by weight.

The lactic acid preferably contains at least 72 percent by weight of free lactic acid.

Preferably, after the pH has been adjusted to 6.5 to 7.0, one to two parts by weight of a 5'-nucleotide are added while the temperature is maintained within the range 60° to 90° C. The nucleotide selected should contain at least about 50 percent by weight of inosinic acid or inosinate, and it may conveniently be added as a mixture of substantially equal quantities of sodium inosinate and sodium guanylate. The pH adjustments during the reaction may be made by adding alkali such as sodium hydroxide.

The reaction mixture obtained by the process of the invention is in the form of a paste containing about 30 to 40 percent by weight of water. It may be further concentrated, for example by evaporation, if desired under reduced pressure, to a moisture content of 12 to 20 percent by weight. The vapors liberated during concentration may be condensed and returned to the concentrated paste, desirably after fractionation.

The concentrated paste may be dried, for example, to a moisture content of 2 to 6 percent by weight. Vacuum drying, preferably at 50° to 80° C., is preferred but other techniques such as belt, spray or freeze drying may be used. The dried material may be ground to any desired particle size.

The flavoring composition according to the invention may be used either in dry form or as a paste, in a wide range of food products, such as, for example, soups, sauces, condiments, bouillons and the like.

It will be seen from the foregoing that the flavoring composition according to the invention is prepared from readily available starting materials by a procedure which does not require specialized equipment or processing techniques.

The following Examples, in which all parts and percentages are by weight, are given by way of illustration only.

EXAMPLE 1

55 parts of yeast autolysate (about 80 percent dry matter, 1.8 percent reducing substances, 7.2 percent total nitrogen, 3.5 percent (amino nitrogen), are mixed with 45 parts hydrolysed peanut protein containing about 80 percent dry matter which has been decolorized with two parts of active charcoal, and 20 parts of enzymatically hydrolysed beef extract containing about 80 percent dry matter. The mixture is heated to 90° C. for 4 hours, cooled to ambient temperature, 2 parts of lactic acid (containing 90 percent of free lactic acid) are added and the mixture is stored at ambient temperature for 10 days.

Thereafter, the water content is adjusted to 30 percent, the pH to 6.3 by addition of sodium hydroxide, and the mixture is heated to 90° C. and held at this temperature for 3 hours. The pH is then adjusted to 6.8 (NaOH) and the mixture is again held at 90° C. for 3 further hours before being evaporated to a paste having a moisture content of about 16–17 percent. The paste is finally dried in a vacuum oven at 80° C. to a final moisture content of about 3 percent. Alternatively, the final mixture may be diluted to 50 percent solids and spray dried.

The dry product is brown in color, and it may be ground to a powder having any desired particle size. It is soluble in hot or cold water, giving a solution having a flavor close to that of a broth prepared from roasted beef. The product also has an enhancing effect on the flavor of various foodstuffs, such as vegetables and mushrooms.

The dry product can be stored for at least 1½ years at 20° C. without any significant alteration in flavor.

EXAMPLE 2

The procedure of Example 1 is repeated, except that after adjusting the pH to 6.8, 2 parts of a blend (50/50) of sodium inosinate and sodium guanylate are added while the mixture is maintained at 80° C.

The final product is recovered as a paste containing 15 percent moisture. It may be stored at ambient temperature for at least 1 year without deterioration.

EXAMPLE 3

The basic procedure is followed as described in Example 1, but the final evaporation is carried out under vacuum at 40° C. and the vapors are fractionated and condensed. A portion of the condensed vapors is incorporated in the evaporated product which is recovered as a paste containing 15 percent moisture.

I claim:

1. A process for preparing a flavoring composition, characterized in that it comprises the following successive steps:

heating, at a temperature of from 60° to 90° C. for from 3 to 5 hours, a mixture of from 40 to 50 parts by weight (dry matter) of yeast autolysate containing from 1 to 6 percent by weight of reducing substances, at least 3 percent by weight of amino nitrogen and at least 7 percent by weight of total nitrogen, from 30 to 40 parts by weight (dry matter) of vegetable protein hydrolysate, from 3 to 6 parts by weight (dry matter) of enzymatically hydrolysed meat extract, from 0.9 to 2.7 parts by weight of lactic acid and from about 10 to about 30 parts by weight of water, holding the mixture at ambient temperature for from 8 to 12 days, adjusting the pH of the mixture to a value of 6.0 to 6.5 and the water content of the mixture to from 25 to 35 percent by weight, heating the mixture to a temperature of 60° to 90° C., holding the mixture at a temperature within this range for 1 to 3 hours, adjusting the pH to a value of 6.5 to 7.0 and maintaining the mixture at a temperature of 60° to 90° C. for 1 to 3 hours.

2. A process according to claim 1, in which 1 to 2 parts by weight of a 5'-nucleotide containing at least about 50 percent by weight of inosinic acid or an inosinate are added to the mixture after the pH has been adjusted to a value in the range 6.5 to 7.0.

3. A process according to claim 1, in which the yeast autolysate contains 1.0 to 2.5 percent by weight of reducing substances.

4. A process according to claim 1, in which the composition is concentrated by evaporation under vacuum and the vapors removed during evaporation are fractionated and condensed and a portion of the condensate is returned to the composition.

5. A process according to claim 1, in which the hydrolysed meat extract is prepared by heating for about 1 hour at a temperature of about 65° C. an aqueous solution of beef or whale meat extract containing about 15 percent by weight of total solids with a quantity of papain corresponding to about 5 percent by weight of the amino nitrogen present in the extract.

6. The flavoring composition obtained by the process of claim 1.

* * * * *